May 25, 1965

D. C. McMILLIN 3,184,866

SHELLFISH GATHERING MACHINE

Filed Nov. 2, 1962

David C. McMillin
INVENTOR.

BY Ramsey, Kolisch & Hartwell
Attys.

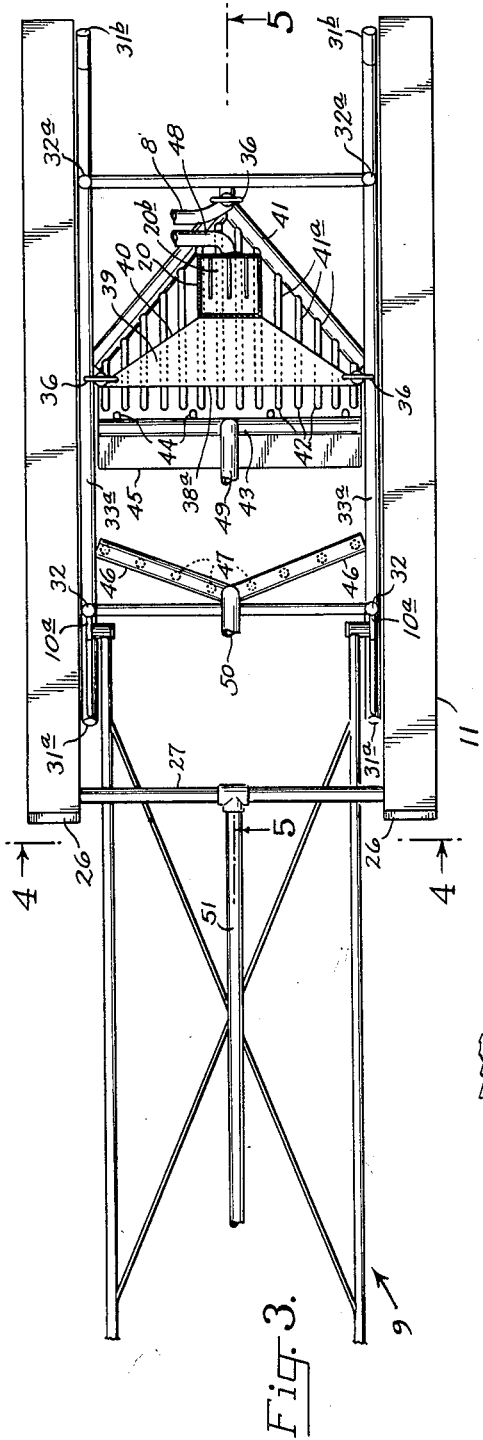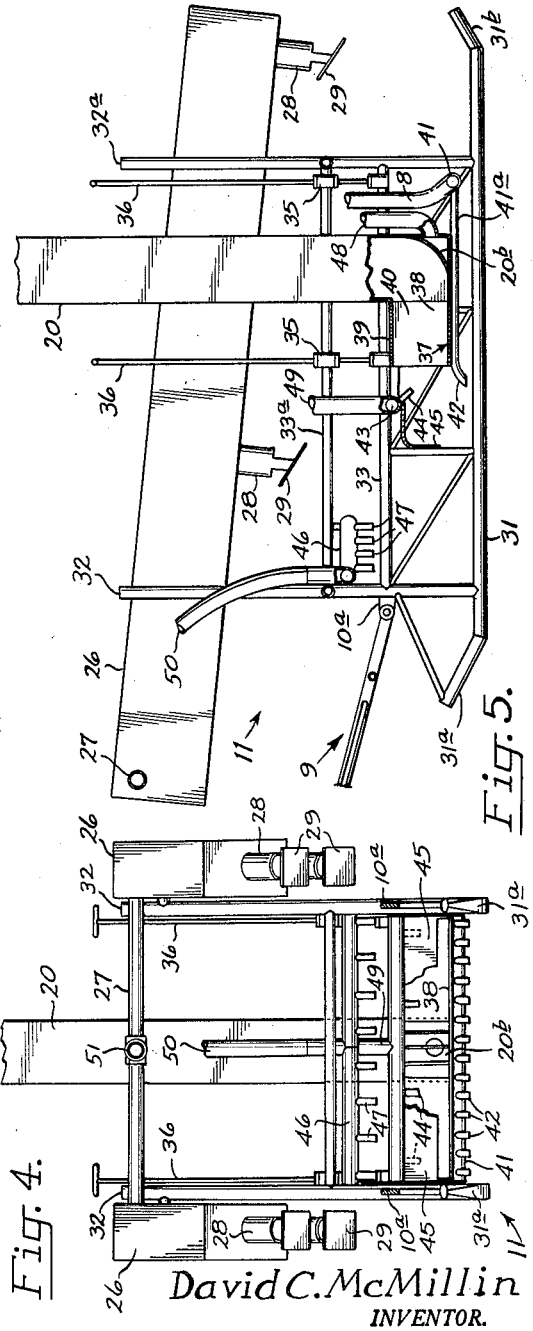
David C. McMillin
INVENTOR.

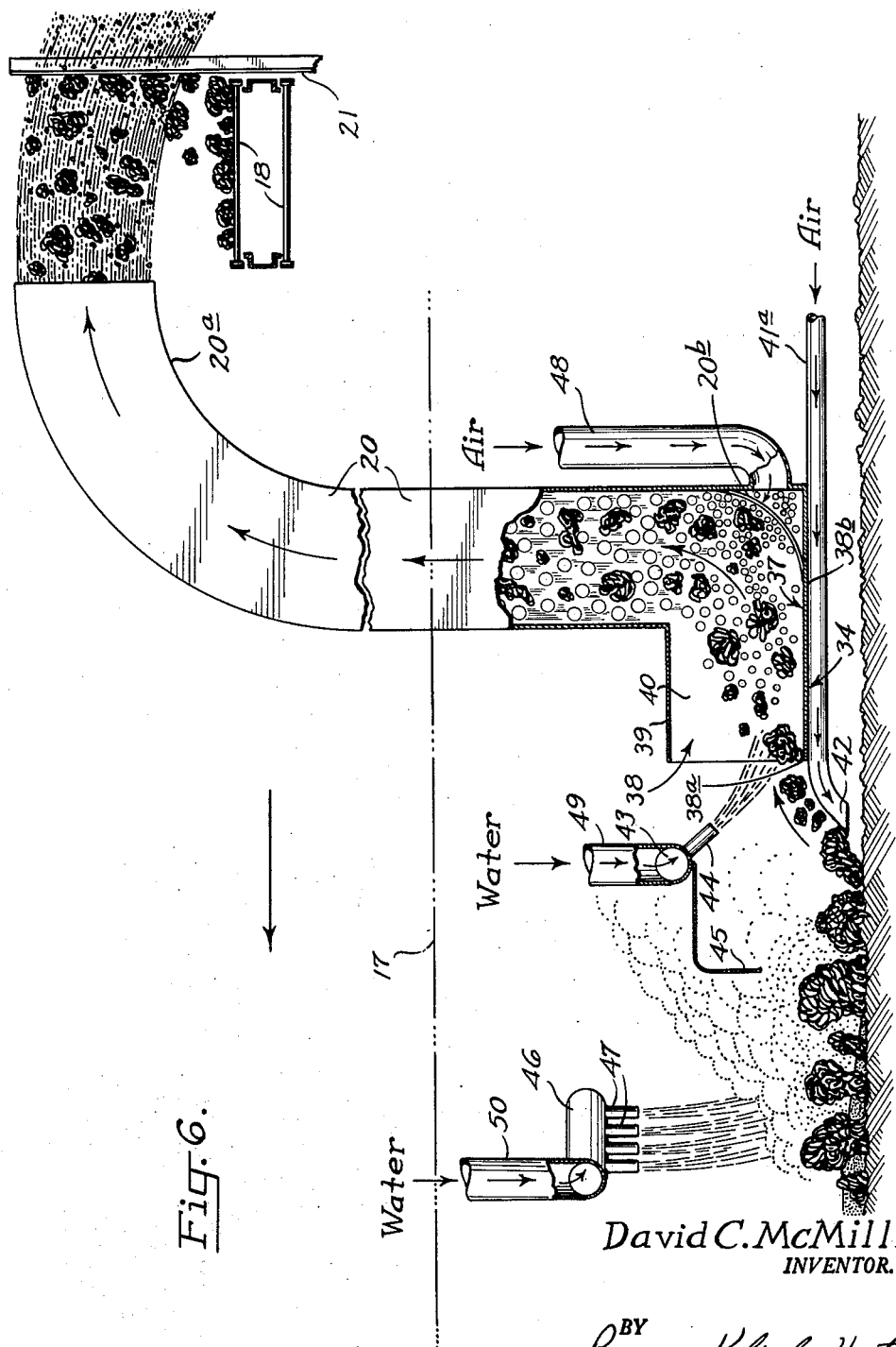

United States Patent Office 3,184,866
Patented May 25, 1965

3,184,866
SHELLFISH GATHERING MACHINE
David C. McMillin, Shelton, Wash., assignor to Olympia Oyster Company, Shelton, Wash., a corporation of Washington
Filed Nov. 2, 1962, Ser. No. 235,003
5 Claims. (Cl. 37—55)

My invention relates to the harvesting of shellfish and particularly oysters. Although it has use over so-called natural beds, it is particularly adapted for use in prepared beds in which oysters are planted, grown and harvested.

The initial cost of preparing such beds is substantial and care must be taken so that during the harvesting operation the beds will not be disturbed unduly, particularly as relates to the plane level surface of the sandy or gravelly bed itself.

In the past the taking of shellfish has disturbed the bed when mechanical harvesting devices have been utilized and thus it has been common to take the oysters for harvest or for transplanting by means of hand tools.

In natural or raw land where no substantial preparation is needed to grow oysters, less care has been exerted and mechanical gathering devices which have high production, have been utilized. This is particularly true on the Atlantic coast where the only care required is that no large holes be dug in the bottom of the bay or shelf from which the shellfish were harvested.

To this end I have invented a shellfish gathering apparatus which may be pulled over the body of water, which the bed underlies, and by a series of nozzles I am first able to wash off the overlying sedimentation which accumulates. Other jets have sufficient velocity so that the encrusted conglomerate of oysters, barnacles and other green growth are broken into relatively large chunks and immediately thereafter air jets are directed from the harvesting machine downwardly and forwardly over the bed so that these chunks are lifted by the conjoint action of velocity and the buoyant air thus directed to a point spaced from the beds, after which the gathering machine is slipped beneath the oysters and other jets propel these chunks over an imperforate pan into an airlift in which large volumes of air are continuously introduced together with induced flow of water and the chunks are forced upwardly to above the water surface. Thereafter, the emitted mixture of air, water, chunks of oysters, sediment, and minute solids such as broken shells are separated one from the other by causing the stream lifted from the bottom to be forced under substantial velocity through a perforate screen which has apertures formed therein sufficient to pass the water, sand, dirt and debris and to retain the clumps of oysters removed from the bed. The oysters thus interrupted in flight drop upon a conveyer and are directed to a gathering scow or vessel where they may be transported to facilities for opening and packaging.

The principal object of my invention is to devise such a machine which may be floated over a bed and have an encrusted oyster broken from the bottom without disturbing the gravel bed and thereafter transported to the top of the water without the use of mechanical devices which might break the oysters and in event would involve wear and depreciation of mechanism which would move below the surface of the water. Oysters and submerged shellfish always are grown in salt water. Metallic and particularly moving parts quickly deteriorate in salt water and in the presence of sand and other highly abrasive materials and thus the use of jets of water and air limit the deterioration of the mechanism and increase the operating life thereof.

A further object of my invention is to provide mechanism which may be pulled along by a tug or other vessel to cut successive swathes from a bed, thus harvesting the bed cleanly to get maximum recovery therefrom, and to preserve a clean bed for replanting.

Further and other details of my invention and the function and use thereof, are hereinafter described with reference to the accompanying drawings, in which:

FIG. 3 is a plan view of a gathering mechanism shown in connection with a portion of the towing mechanism and with the fluid conduits shown foreshortened;

FIG. 4 is a vertical section taken on the line 4—4 in FIG. 3 showing the relationship of the digging portions of a harvesting mechanism with relation to inflatable floats which lift the mechanism to the surface when it is out of operation;

Figure 1:
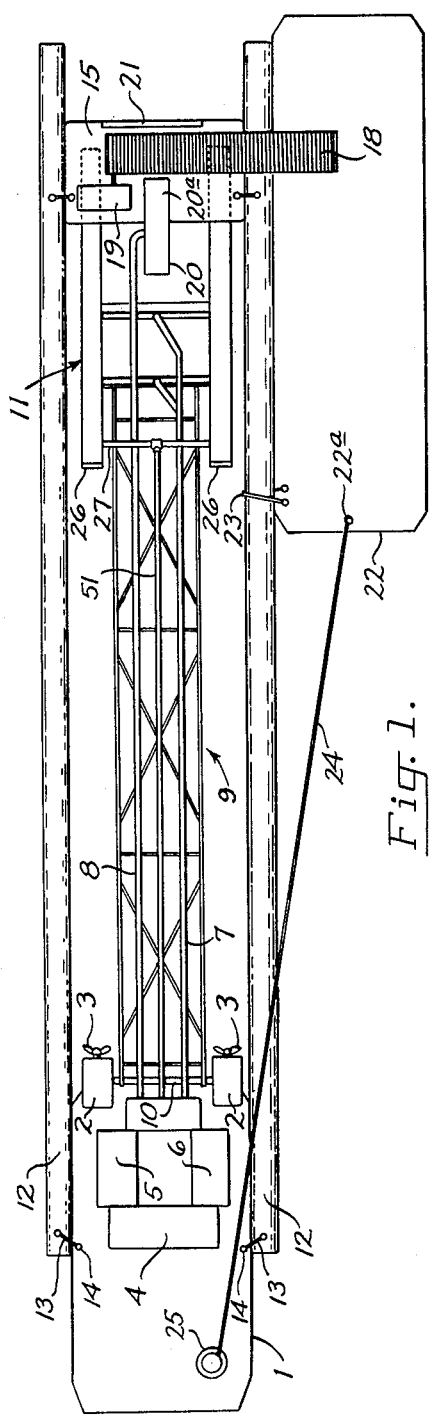
FIG. 1 is plan view, somewhat schematic, of a harvesting mechanism considered broadly as comprising a towing vessel, an articulated gathering device which works upon the bed to be harvested, and a receiving boat upon which the gathered shellfish may be collected and taken to a plant upon the shore without requiring the harvesting mechanism to be moved from over a spot in the bed itself.

FIG. 5 is a longitudinal section taken through the gathering mechanism on the line 5—5 in FIG. 3; and FIG. 6 is a more or less schematic view illustrating the action of the washing nozzles, the air nozzles and the flushing nozzles with respect to a washing pan and its overlying throat member illustrating the manner in which the shellfish are broken from the bed, airlifted in chunks onto the pan and thereafter lifted by the airlift and including the upper end of the discharge duct defining the airlift illustrating the jet projects horizontally toward and through the separating screen.

Shellfish grow naturally upon so-called tidal flats in salt water over which a current flows so that any silt deposited thereon will be swept from the bed so that the shellfish will not become covered. An ideal bed is one having a plane gravelly surface of sufficient solidity that it could easily be walked upon without making much of an impression thereon. Thus, the bed is level or, in any event, more or less flat and free of any abrupt undulations. To keep such a bed level and flat, harvesting operations of successive crops of shellfish have been accomplished by means of hand operated tools in which the oysters or other shellfish are lifted without disturbing the surface of the bed. To increase production, decrease cost, and to aid in the harvest of shellfish, many types of automatic gathering devices have been suggested and utilized. They have one common disadvantage, however, that is that they disturb to a greater or lesser extent, the smooth or natural surface condition of the oyster bed and thus when successive crops are planted and harvested, this may be done only by exercising unusual care or by recovering only a portion of the shellfish that are mature.

The natural raw land is of limited quantity and thus in the tidal flats of Puget Sound it has been common to build oyster beds which are rectangular areas or so-called cribs with upstanding bounding walls erected to a level that the water will be entrapped thereover and will always keep said beds covered. Such artificial beds are expensive to build and to maintain and thus the maintenance of a smooth surface is of greater importance in artificial beds than when raw or natural land was available and without limit. Inasmuch as said prepared beds and their bounding walls define dikes in which the tops of the walls stand above the plane of the bed itself and water will be entrapped within said marginal walls and keep the beds covered, it is difficult to keep the beds free of accumulation of sedimentation. This is particularly important in the planting beds and in the fattening beds where the oysters are immature. In such beds when oysters are lifted from the bed for transplating or harvesting for use, they must be washed free of said overburden of sediment, they must be gently handled so that there is no substantial loss, and the harvesting operation must be clean. That is to say, all of the oysters in an area should be removed with as little damage as possible either to the oysters or to the beds upon which these shellfish were reared. It is in this environment that my invention finds its greatest use. It also has use in connection with the gathering of shellfish from natural or raw land, but not to such as great a degree as in artificial land with a cultivated crop.

Figure 2:
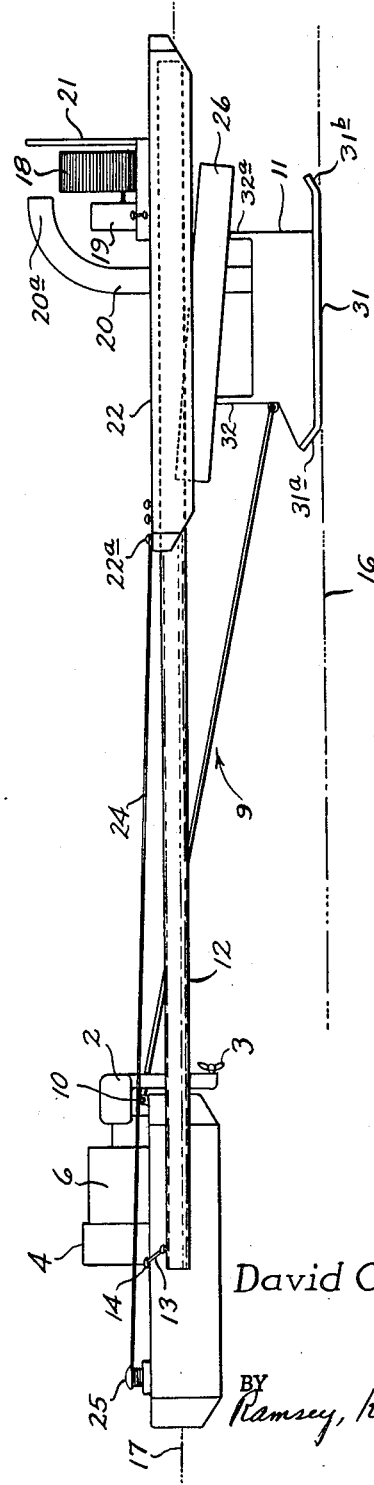
FIG. 2 is an elevation of said structure showing the parts as they appear when removing shellfish from the bed of a body of water upon which the towing and receiving vessels float.

The harvesting apparatus embodied in my invention includes a towboat, one of which is shown in FIGS. 1 and 2 as a square ended scow 1. It is propelled by one or more dirigible motors 2 which drive propellers 3. The presence of two laterally spaced manipulable motors and propellers gives propulsion to the boat, as well as direction to its path of travel. Also carried by said boat is a power plant 4, a pump 5 and a compressor 6, the pump and compressor being driven by the power plant. The pump takes water from the body of water over which the operation is being performed and transmits it under high pressure and high volume through a conduit 7 to a harvesting sled 11. Air under high pressure and volume is delivered by the compressor to the harvesting boat through conduit 8.

Joined to the stern of said towboat is an articulated mast or towing connection 9 which preferably is made of cross-braced structural elements. It is carried by a pintle shaft 10 lying athwart the stern of the towboat 1. The towing connection is cross braced and is relatively rigid though articulated upon transverse axes at each end and functions to cause the harvesting sled 11 to trail the towboat accurately, thus to produce a swath along the path traversed by the towboat without substantial deviation therefrom. Also joined to the towboat are a pair of spaced buoyant elongated members 12. I use boom logs for this purpose because they have long life in the water and are relatively inexpensive. They are joined amidship of the towboat by connections 13 which may be in the form of looped cables joined to the towboat through cleats 14 carried by the deck of the towboat. The form of connection of the boom logs to the towboat is unimportant and there is always accommodation required for each particular installation that will suggest itself to a person skilled in the art.

The trailing ends of said buoyant members 12 are joined by an overlying platform 15. The elongated members straddle the harvesting sled 11 and are free therefrom so that the harvesting sled may be raised to the surface 17 of the water upon which the boom logs float or may be lowered to the bed 16 from which the shellfish are to be gathered. This is illustrated in FIG. 2 in which the bed 16 and the surface 17 of the body of water are shown.

A transverse conveyer 18, powered by a motor 19, is supported upon the platform 15 and reaches across one of the boom logs 12, as is illustrated in FIG. 1. An airlift conduit 20 reaches from the harvesting sled 11 up to and above the surface of the body of water, as is illustrated in FIG. 2, and discharges a stream or jet of water, sand, dirt and other debris together with the oysters transported thereby across said transverse conveyer and toward a vertical perforated screen 21, carried by the platform rearwardly of the conveyer. The apertures in the screen are predetermined in size so that the shellfish will not pass therethrough but will fall upon the conveyer and be discharged by the conveyer 18 on to the receiving boat 22.

The receiving boat 22 is adapted to slide along the external face of the boom log 12, as is shown in FIG. 1. Preferably a loop 23 is provided to hold the receiving boat against the log but to permit it to slide readily fore and aft of the latter. A tow line 24 reeved about a capstan 25 is adapted to position the receiving boat longitudinally with respect to the discharge from the conveyer 18. It is not necessary that the capstan be powered. It may be convenient to originally locate the boat so that it is arranged generally as shown in FIG. 1 and then by paying out the tow line 24 it will move relatively rearwardly with respect to the harvesting machine and thus the oysters discharged from the conveyer will be arranged in a row longitudinally of the receiving boat.

The tow line preferably extends obliquely from the capstan to the point 22a on the receiving boat so that the entire tow as it is pulled along causes the receiving boat to be pulled towards the adjacent boom log and thus the loop 23 is not subject to any great friction and consequent wear. As is illustrated in FIG. 2 when the harvesting sled 11 is in operating position and resting upon the bed of the body of water, the mast depends rearwardly to a lower plane. This articulation is permitted by the pintle shaft 10 at the forward end of said mast, and by a pivot connection comprising a pair of ears 10a upon the harvesting sled. The ears are usually fixed near the bottom of the harvesting sled so that the towing connection will tend to cause the harvesting boat to be lifted up slightly and thus not to dig into the bed operated upon.

The harvesting sled 11 is adapted to be buoyantly supported upon the surface of the water by a pair of pontoons 26 extending lengthwise of the sled and lying above it, as is shown in the FIGS. 1 and 2. These are supplied with air through a transverse manifold 27, as is shown most clearly in FIGS. 3 and 4. The manifold is served with a supply of air by the air conduit 7. When the pontoons are filled with air they will buoyantly lift the harvesting sled to the surface of the body of water and when air is discharged therefrom said pontoons fill with water which cause the sled to ride upon the surface of the bed to be harvested.

Each of the two pontoons shown in the drawings may be continuous, that is, made in communicating sections or they may be provided with a transverse partition which separate them into separate cells. In either event water discharge skirts 28 permit the water to be discharged therefrom. Across the discharge ends of the skirts is an obliquely arranged deflector 29 on each skirt. The purpose of these deflectors is to cause the water discharged under high velocity by the inrushing air to empty the water from the pontoons to be diverted so that the onrushing water will not cause holes to be formed in the portion of the bed being operated upon and underlying the skirts. Each pontoon is joined to a common air supply and thus air is admitted equally and the water is discharged simultaneously and vice versa so that the pontoons always are in lateral and longitudinal balance and the harvesting sled will not cant for this reason. Also the structural rigidity of the towing mast 9 inhibits canting in the sled which thus rises and falls in a horizontal plane when it is lifted and lowered in a vertical path. The harvesting sled is made of structural members including two runners 31 extending along the bottom at the lateral sides thereof.

Each runner has a plane under surface proportioned and arranged to support the harvesting sled by the overburden but to seek a level at a datum plane at the surface of the bed. In a typical installation the runner surfaces are nine feet long and from 1½" broad to 3" broad, depending upon the weight of the harvesting sled 11.

These runners preferably are made of extruded sections. Each runner 31 has an upturned nose portion 31a and a trailing rear portion 31b. This produces a sled-like action so that as the harvesting sled 11 is pulled along a bed, it does not tend to plow into or gouge the bed being harvested. Vertical members 32–32a join the runners and the pontoons 26. The pontoons are elongated and are preferably arranged so that the forward end of each stands at a higher level than does the trailing end thereat. This produces better trailing action when the sled is moved over the surface of the water and the pontoons are used for buoyantly supporting the sled, as when such sled is lifted from the bed and is to be moved to a different location.

Horizontal members 33, 33a brace the vertical members and are stacked one above the other, as is shown most clearly in FIG. 5.

A harvesting pan 34 underlies the lower most horizontal member 33 and is adjustable vertically by the use of turn buckles 35, preferably three in number. The threaded rods 36 of the turn buckles are quite long so that they may be adjustably rotated to vary the vertical position of the harvesting pan within the framework of the sled. The use of three turn buckles and associated rods permits the pan to be solidly mounted and closely adjusted with respect to the sled runners or skids. In most oyster beds there is an overburden of silt that accumulates upon the hard gravel bed upon which oysters grow and this may be several inches thick. The sled and its flotation tanks are similarly constructed that the weight thereof will cause the sled runners to push through the overburden of silt and run substantially upon the upper surface of the gravel bed. Depending upon the thickness of this overburden, the harvesting pan is arranged to clear the sediment when the runners are supported by the bed being operated upon. The harvesting pan has an imperforate bottom 37 and an overlying throat member 38. It is of truncated V-shaped form, as is shown in FIG. 3, with its flattened apex terminating in the base of the airlift conduit 20. The top member 39 of said throat element is spaced substantially from the bottom member 38b thereof and sidewalls 40 enclose the throat so that it is open across its mouth a distance comparable to the overall width of the harvesting sled and its back portion is constricted to a dimension that is substantially equal to the width of the airlift conduit 20. Underlying said throat member is an air supply device comprising a manifold 41 which is of V-shaped configuration, as is illustrated in FIG. 3, and a plurality of longitudinally disposed parallel branches 41a that extend forwardly projecting teeth which engage oysters or other shellfish to be lifted from the bed and also constitute conduits by which jetted air under high velocity and pressure may be directed downwardly at the base of such shellfish not only to loosen the shellfish from the bed immediately ahead of the forward projections but also to lift shellfish upwardly so that they will float over the forward edge 38a of the throat member.

Overlying said forward edge 38a is a transverse water manifold 43 having a plurality of nozzles 44 directed downwardly and rearwardly so as to sweep over the bottom floor of the throat member and to cause anything upon said floor to be swept rearwardly into the reticulated bottom or mouth 20b at the lower end of airlift conduit 20. A curtain wall 45 lies ahead of the edge 38a so as to limit access into the throat member. Said curtain wall extends downwardly across the upper half of the throat which is the space between the bottom member 38 and the top member 39 but in advance of said throat member. This prevents foreign objects or large unbroken sections of encrusted shellfish from being forced into the throat so as to interfere with the action of the airlift discharge therefrom.

Forward of said curtain wall is a water manifold 46 that extends substantially transversely of the harvesting sled and has plural nozzles 47 directed vertically towards the bed. The function of this water manifold and nozzles is to direct high pressure, high velocity water in jets immediately in advance of the gathering operation to wash off the silt overburden which partially covers the shellfish to be gathered. It also tends to wash the shellfish somewhat of dirt and foreign matters so that when they are gathered they have no hardened surface encrustations thereon.

Large volumes of air at high pressure are introduced into the base of the airlift conduit through an air hose 48 so as to cause oysters at the back of the throat to be rapidly and violently lifted upwardly through the airlift conduit and discharged from the curved upper end 20a thereof.

Water for the nozzles 44 and 47 is supplied by sections of hose 49 and 50 respectively. Water is discharged into and through said hoses by the pump 5 upon the towboat. Said hoses preferably are flexible and are carried from the towboat to the harvesting sled by being supported upon the mast or towing connection, as is shown in FIG. 1. Likewise, air for the airlifts for the manifold 41 and its branches 41a and for the pontoons 26 are provided by airline 51 and branches thereof.

It is necessary to have appropriate controls for controlling the volume of air to the several nozzles and to the pontoons and to cut off said supply of air selectively and appropriate valves (not shown) are provided for this purpose. The choice of size and arrangement would be self-suggestive to a person skilled in the art.

The operation and function of this shellfish harvesting equipment is as follows:

In a typical harvesting bed in which oysters are planted, fattened and harvested, cribs are more or less horizontally disposed and are bounded by upstanding imperforate walls that extend above the beds approximately six inches, or so. This assures the beds are always covered by water, even in extremely low tides. These cribs are of considerable extent and it is common to harvest the oysters by cutting a swath down one side of a bed and then moving the harvesting equipment laterally and taking a parallel swath alongside of the first one and so on until the bed is completely harvested. It is common to place poles or markers at the edge of a swath and to have feelers extend laterally from the tugboat so that even through the water is of substantial depth, the man in charge of harvesting can determine exactly the path that the tugboat should follow in order to take up all of the shellfish to be harvested in the entire bed. In one harvesting organization the sled is approximately 4' wide and the successive swathes are spaced upon 3½' modules so that there is an overlap between the swathes to clean the bed entirely of the oysters or the shellfish that are found therein. Most of the beds have an overburden of silt thereon that has accumulated during the growth period of the oysters and the depth of the overburden is first determined. Then the turn buckles are adjusted so that the plane sled runners will slide over the bed which is the datum plane from which harvesting is gauged. The forward end of the obliquely downturned projections 42 or tines are then set so that they will engage the shellfish initially somewhere adjacent the middle of the vertical height or length thereof. Oyster shell of the Pacific type, as grown on the West coast, may grow as large as 8 to 10 inches in length while the Olympia oysters might only be two inches in length. Thus, if Pacific oysters are being gathered, the tines produced by the obliquely turned down projections 42 are set approximately 1½ inches to 2 inches above the bed. In harvesting Olympia oysters a lesser spacing may be provided. This is done by adjusting the turn buckle rods 36 from above the harvesting sled until they produce the correct elevation of projections 42 from the datum plane. Then the compressor and pumps are turned on to project air and water jets downwardly through their respective nozzles. The function of the main jet water nozzles 47 is to sweep substantially all of the silt or other overburden from the oysters to be harvested. This is pushed to one side of the proposed swath. The towboat is then propelled forwardly along a path on which a swath is to be made at proper speed determined by the quantity of oysters being gathered. The air emitted through the downturn ends 42 is of substantial volume and velocity and is directed against the base of a shellfish growth so that when the points engage the shellfish at a point somewhere below the middle of the height of the oysters, they are loosened and the air immediately sweeps them up in turbulent fashion so that they are swept into the throat member of the harvesting machine. To aid them in moving backwardly into the throat the flush water jet nozzles 47, which project downwardly and rearwardly, force them into the narrowed throat defined by the sidewalls 40. Then they are restrained from passing through reticulated grid 20b in the floor of the throat member 38 and thus enter into the base of the airlift conduit 20.

The air discharged into the bottom of the airlift conduit is under high pressure and extremely large volume. The cross sectional area of the duct or conduit is approximately 12 inches square and the air discharged thereinto produces a high velocity stream of air and water flowing upwardly through the duct and out through the curved upward end 20a thereof. This stream is approximately 12 inches across and is discharged more or less horizontally to and through the vertical screen 21 at the rear end of the platform 15. The perforations of such screen are selected so that the water, sand, silt and small particles of shell will pass readily therethrough but the oysters being discharged will be intercepted and will drop upon the upper flight of the conveyer 18.

The conveyer then constantly discharges the oysters thus collected on to the deck of the receiving boat 22. The receiving boat preferably has a deck of sufficient width so that when a conic pile of oysters is discharged thereon and assumes its angle of repose the receiving boat may then be dropped back by slacking the tow line 24. This is done progressively until the entire deck is covered with oysters in a ridge pile extending from one end to the other. Said receiving boat may then be released and another one put into position and the harvesting operation will continue. The two sets of air nozzles, one from the downturned projection 42 and the other discharged into the base of the airlift conduit, causes the oysters being gathered to be separated into small clumps and when they are discharged they are free of loose dirt, but have not been subject to rough and damaging handling.

I deem it critical that the jets emitted from the obliquely downturned projections 42 be provided to augment the mechanical lifting of said projections because in this way the beds are not rutted or gouged. A critical inspection after one pass has been completed, and at low tide, reveals that upon the beds the marks of the sled runners are visible by furrows extending possibly one inch deep into the silt overburden. Between said ruts there are faintly defined furrows of little depth that do not extend even through the overburden. This is important when artificial beds are to be reused because the beds after they are once harvested are not subject to rough usage, gouging or having holes or furrows formed therein and the expense of preparing them for reseeding is thus eliminated.

I claim:

1. A shellfish gathering apparatus comprising an elongated sled adapted to be pulled over a submarine bed underlying a body of water, having a forward end and an aft end, said sled having a pair of spaced elongated runners each having a horizontally disposed plane surface of predetermined breadth adapted to support said sled upon said bed and to slide thereover, said sled being devoid of any portion lying below the plane of the surfaces of said runners, an imperforate pan extending generally in a horizontal plane, spaced above the plane of said runner surfaces and spanning the lateral space between them, a plurality of vertically disposed, laterally spaced water nozzles spanning the space between the forward ends of said runners adapted to discharge jets of water a predetermined distance forward of the forward edge of said pan, a plurality of flushing water nozzles spaced above the forward edge of said pan, positioned and arranged to emit jets downwardly and rearwardly of the said forward edge and sweeping over the upper surface of said pan, a forwardly opening throat member overlying and vertically spaced from said pan, closing the sides and back portions thereof, a vertically disposed discharge stack communicating with the interior of said throat member adjacent the back thereof and extending upwardly to a point above the surface of said overlying body of water, an air supply line having a point of discharge into the bottom of said stack so that when air is discharged into the stack it constitutes an airlift, a series of agitating conduits jointed to said air supply line underlying said pan and projecting forwardly thereof, the forward terminal ends thereof defining agitating air nozzles projecting downwardly and forwardly immediately ahead of the forward edge of the pan, being positioned and arranged to sweep over the bed, to loosen shellfish growing on said bed, and to lift them upwardly above the forward edge of the pan and into the path of the flushing nozzles, which force them rearwardly over said pan into the throat member and thereafter into the airlift.

2. Shellfish harvesting equipment comprising a towboat, a buoyant but submersible harvesting sled, an articulated boom, and a receiving boat, a pair of buoyant elongated members straddling the harvesting sled and the articulated boom, a platform joining the trailing ends of said buoyant elongated members and overlying the harvesting sled, a vertically projecting airlift carried by said sled extending from the bed of the body of water when the harvesting sled rests upon the underlying bed to a point above said platform, said airlift terminating at its upper end in a generally horizontal trailing section overlying said platform, a perforated vertical screen having apertures formed therein of predetermined size to pass water, sand, mud, and small particles of solids and to prevent the shellfish from passing therethrough, said screen being fixed adjacent the trailing edge of said platform, and a transverse conveyer lying intermediate the trailing section of the airlift and the screen for discharging shellfish from the platform to said receiving boat, whereby water, shellfish, sand and minute foreign solids are projected laterally from the airlift toward said screen, the shellfish being larger than the screen apertures being interrupted, falling upon the conveyer and the water, sand and minute foreign solids passing therethrough and being discharged rearwardly of said platform.

3. Shellfish harvesting equipment comprising a towboat, a buoyant but submersible harvesting sled, and a receiving boat, the towboat and harvesting sled being joined by an articulated boom to maintain trailing relationship of said sled with the towboat, a pair of buoyant elongated members straddling the harvesting sled and the articulated boom, a platform joining the trailing ends of said buoyant elongated members and overlying the harvesting sled, a vertically projecting airlift carried by said sled extending from the bed of the body of water when the harvesting sled rests upon the underlying bed to a point above said platform, said airlift terminating at its upper end in a generally horizontal trailing section overlying said platform, a perforated vertical screen having apertures formed therein of predetermined size to pass water, sand, mud and small particles of solids and to prevent the shellfish from passing therethrough, said screen being fixed adjacent the trailing edge of said platform, and a transverse conveyer lying intermediate the trailing section of the airlift and the screen for discharging shellfish from the platform to the receiving boat, whereby water, shellfish, sand and minute foreign solids are projected laterally from the airlift toward said screen, the shellfish being larger than the screen apertures being interrupted, falling upon the conveyer and the water, sand and minute foreign solids passing therethrough and being discharged rearwardly of said platform, towing connections from the towboat to the receiving boat independently manipulable to provide relative movement between the receiving boat and the conveyer.

4. Shellfish harvesting equipment comprising a towboat, a buoyant but submersible harvesting sled, an articulated boom and a receiving boat, a pair of buoyant elongated members straddling the harvesting sled and the articulated boom, a platform joining the trailing ends of said buoyant elongated members and overlying the harvesting sled, said harvesting sled having inflatable tanks with a selective air supply control means for said air supply, to cause the harvesting sled to float upon a body of water or to glide over a shellfish bed underlying said body of water, a vertically projecting airlift carried by said sled extending from the bed of the body of water when the harvesting sled rests upon the underlying bed to a point above said platform, said airlift terminating at its upper end in a generally horizontal trailing section overlying said platform, a perforated vertical screen having apertures formed therein of predetermined size to pass water, sand, mud, and small particles of solids and to prevent the shellfish from passing therethrough said screen being fixed adjacent the trailing edge of said platform, and a transverse conveyer lying intermediate the trailing section of the airlift, and the screen for discharging shellfish from the platform to the receiving boat, whereby water, shellfish, sand and minute foreign solids are projected laterally from the airlift toward said screen, the shellfish being larger than the screen apertures being interrupted, falling upon the conveyer and the water, sand and minute foreign solids passing therethrough and being discharged rearwardly of said platform.

5. Shellfish harvesting equipment comprising a towboat, a buoyant but submersible harvesting sled, and a receiving boat, the towboat and harvesting sled being joined by an articulated boom to maintain trailing relationship of said sled with the towboat, a pair of buoyant elongated members straddling the harvesting sled and the articulated boom, a platform joining the trailing ends of said buoyant elongated members and overlying the harvesting sled, said harvesting sled having inflatable tanks with a selective air supply control means for said air supply, to cause the harvesting sled to float upon a body of water or to glide over a shellfish bed underlying said body of water, a vertically projecting airlift carried by said sled extending from the bed of the body of water when the harvesting sled rests upon the underlying bed to a point above said platform, said airlift terminating at its upper end in a generally horizontal trailing section overlying said platform, a perforated vertical screen having apertures formed therein of predetermined size to pass water, sand, mud, and small particles of solids and to prevent the shellfish from passing therethrough said screen being fixed adjacent the trailing edge of said platform, and a transverse conveyer lying intermediate the trailing section of the airlift and the screen for discharging shellfish from the platform to the receiving boat, whereby water, shellfish, sand and minute foreign solids are projected laterally from the airlift toward said screen, the shellfish being larger than the screen apertures being interrupted, falling upon the conveyer and the water, sand and minute foreign solids passing therethrough and being discharged rearwardly of said platform, towing connections from the towboat to the receiving boat independently manipulable to provide relative movement between the receiving boat and the conveyer.

References Cited by the Examiner

UNITED STATES PATENTS

| | | | |
|---|---|---|---|
| 770,367 | 9/04 | Hall | 37—55 |
| 1,070,271 | 8/13 | Lybeck | 37—55 |
| 1,180,664 | 4/16 | Littlehales | 37—62 |
| 2,204,584 | 6/40 | Flower | 37—55 X |
| 2,363,251 | 7/43 | Jurisich | 37—55 |
| 2,508,087 | 5/50 | Bailey | 37—55 |
| 2,610,415 | 9/52 | Glaser | 37—63 X |
| 2,672,700 | 3/54 | Hanks | 37—55 |
| 3,010,231 | 11/61 | Matelich | 37—54 |

FOREIGN PATENTS 4,834    1879    Great Britain.

BENJAMIN HERSH, *Primary Examiner.*